Patented July 21, 1953

2,646,431

UNITED STATES PATENT OFFICE 2,646,431

PYRAZINE DERIVATIVES AND METHODS OF PREPARING THE SAME

Harry P. Dalalian, Rutherford, N. J., and Samuel Kushner, Nanuet, N. Y., assignors to American Cyanamid Company, New York, N. Y., a corporation of Maine No Drawing. Application September 26, 1951, Serial No. 248,454

14 Claims. (Cl. 260—250)

1

This invention relates to new organic compounds. More particularly, the invention relates to thiolpyrazinoates and methods of preparing the same.

In the past it is known to prepare pyrazine monocarboxylic acid and derivatives such as esters. However, in general, these compounds do not possess bacteriostatic or bacteriocidal properties.

We have now found that the thiolpyrazinoates hereinafter described exhibit activity against acid-fast bacteria such as tubercle bacillus. These compounds may be represented by the following structural formula:

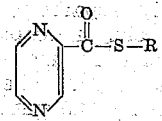

in which R is an alkyl, aryl, aralkyl, carbalkoxyalkyl, thiocarbalkoxy or heterocyclic radical.

These compounds are, in general, crystalline solids, however, in some cases they are liquid. They are generally soluble in the common organic solvents such as petroleum ether, acetone, ether, etc. They are usually only slightly soluble or insoluble in water.

In preparing the compounds of the present invention we react pyrazinoyl chloride with a mercaptan having the formula:

in which X is hydrogen or an alkali metal or a heavy metal such as lead and R is as defined hereinbefore.

The first intermediate used in the process of the present invention is pyrazinoyl chloride, a known compound. It is preferred that this compound be freshly prepared since it has a tendency to decompose on standing. This intermediate is usually prepared by heating pyrazinoic acid with thionyl chloride and distilling off the desired acid chloride after removing the excess unreacted thionyl chloride.

The mercaptans used as the second intermediate in the present reaction are, in general, known compounds. The alkyl mercaptans may be those having alkyl groups such as methyl, ethyl, propyl, butyl, amyl, decyl, etc. They may also be metal derivatives such as lead methyl mercaptide, lead ethyl mercaptide, lead n-propyl mercaptide, lead butyl mercaptide, lead amyl mercaptide, etc. Corresponding alkali metal compounds such as sodium derivatives can be used in a similar manner. Furthermore, the mercaptans can be compounds such as, for example, thiolphenol, para-chlorothiolphenol, para-bromothiolphenol, para-iodothiolphenol, para-carboxythiolphenol or carboxy thiolphenols. The aralkyl mercaptans such as benzyl, phenethyl, phenpropyl and the like can be used in the present reaction.

The process of the present invention is generally carried out in an organic solvent such as ether, benzene, ethyl acetate and the like. It can, however, be carried out by merely mixing the intermediates. The reaction usually takes place at room temperature, although the temperature may vary from about 20° to 120° C. or higher, depending upon the particular intermediates or solvent used.

The reaction, when carried out at room temperature, is usually allowed to stand overnight or longer. However, if higher temperatures are used, such as the refluxing temperatures of the solvents enumerated above, the reaction may be complete in a matter of one-half hour.

On completion of the reaction, the crude reaction product is usually purified by treatment with activated charcoal and distilled. The product can be further purified in the case of solids by crystallization from organic solvents such as hot ethanol or hot acetone. In the case of products which are liquid at room temperature, they are usually purified by fractional distillation.

The compounds of the present invention show bacteriostatic and bacteriocidal properties for acid-fast bacteria such as the human tubercle bacillus. They are active in vivo and may prove to be of value in the treatment of infection caused by this bacillus.

The present invention will now be illustrated in greater detail by means of the following specific examples showing the preparation of representative thiolpyrazinoates.

EXAMPLE 1

*Methylthiolpyrazinoate*

30 gms. of lead methylmercaptide, 24 gms. of pyrazinoyl chloride (freshly prepared) and 300 ml. of dry ether were all stirred together overnight at room temperature. The ether was decanted off and the residue was extracted three times with 100 ml. portions of dry ether. The ether solution was cooled in an ice-bath and then washed twice with 200 ml. of ice cold sodium hydroxide solution. The ether solution was dried, treated with activated charcoal and then distilled off. The residue was a dark brown liquid which crystallized out upon cooling. Crude yield, 25 gms. of dark brown crystals. It was purified twice from acetone and crystallized from hot alcohol. Sintered 61°–65° C. melting point 65°–66° C. Partly soluble in petroleum ether (20°–40° C.) water, soluble in acetone, 95% alcohol, absolute alcohol and ether.

EXAMPLE 2

Ethylthiolpyrazinoate

To about 300 ml. of dry ether was added 18 grams of freshly prepared pyrazinoyl chloride and then, while swirling the flask, 23 grams of lead ethylmercaptide was added. After the addition of lead ethylmercaptide was completed, the flash was shaken by machine for about five hours. At first, the suspension was yellowish brown and later it changed to purplish red. The contents of the flask was filtered and washed several times with dry ether. The ether insoluble portion was discarded. The filtrate (ether solution) was next washed twice with 200 ml. of 5% ice-cold sodium hydroxide solution. The ether solution was dried with anhydrous magnesium sulfate and treated with activated charcoal and filtered. The ether was distilled off and left about 18 gms. of brown-colored liquid which had a very powerful mercaptan odor. This liquid was then distilled under reduced pressure and the following fractions separated:

| Fractions | Pot Temp., °C. | Distillation Temp., °C. | Pressure in mm. | Remarks |
|---|---|---|---|---|
| I | 100–130 | 40–65 | 10 | Colorless liquid, odor of mercaptan. |
| II | 130–150 | 65–70 | 5 | Do. |
| III | 160–180 | 100–108 | 5 | Do. |

The third (III) fraction on analysis for carbon, hydrogen, nitrogen and sulfur was in agreement with the theoretical values for ethylthiolpyrazinoate.

EXAMPLE 3 n-Propylthiolpyrazinoate 23 gms. of freshly prepared pyrazinoyl chloride was suspended in 200 mls. of dry benzene. This was kept at room temperature and to this was slowly added 12.4 gms. (16 ml.) of n-propylmercaptan dissolved in 100 ml. of dry benzene. This was stirred overnight. The benzene solution was decanted off and the residue left in the flask was extracted three times with 50 ml. portions of dry benzene. The benzene solution was treated with activated charcoal and dried. It was next distilled off and a dark liquid remained, which upon cooling had few crystals. These crystals were filtered off. Crude yield was 27 gms. of dark liquid. These crystals were purified twice from hot acetone. An aqueous solution has a pH of about 2. These crystals are pyrazinoic acid. Another batch of crude n-propylthiolpyrazinoate was prepared by the above procedure and a crude yield of 13 gms. was obtained. The two crude products 27 and 13 gms. were distilled together under reduced pressure. The fraction distilling at 155° to 180° C. was a colorless liquid with a mercaptan odor. The liquid on analysis was n-propylthiolpyrazinoate.

EXAMPLE 4 n-Propylthiolpyrazinoate

The n-propylthiolpyrazinoate of Example 3 was also prepared in the crude form by the reaction of freshly prepared pyrazinoyl chloride with lead n-propylmercaptide by stirring overnight. In the reaction benzene was used as a solvent and the procedure was the same as that of Example 3. A yield of 35 gms. of crude n-propylthiolpyrazinoate as a brown liquid was obtained.

EXAMPLE 5

Phenylthiolpyrazinoate 19 gms. of freshly prepared pyrazinoyl chloride and 15 gms. of thiolphenol were added to 300 ml. of dry benzene and refluxed for a half hour. The benzene was decanted off and the residue was extracted three times with 150 ml. of hot benzene. The benzene solution was treated with activated charcoal, dried and finally distilled off. The residue was 29 gms. of crude dark liquid. Upon cooling it crystallized out. It was purified twice from hot acetone and from hot ethanol. The product was further crystallized twice from hot acetone and gave cream-colored crystals which sintered at 145°–150° C. The pure product was fairly soluble in acetone, benzene, partly soluble in 95% alcohol, absolute alcohol, ether, insoluble in petroleum ether (20°–40°) and water.

EXAMPLE 6

Benzylthiolpyrazinoate 12 gms. of freshly prepared pyrazinoyl chloride, 25 gms. of lead benzylmercaptide and 250 ml. of dry benzene were all refluxed together for three hours on the stream-bath. The benzene was decanted off and the residue extracted three times with 100 ml. portions of hot benzene. The benzene solution was cooled down to about 10° C. and then washed twice with 200 ml. portions of ice cold 5% sodium hydroxide solution. The benzene solution was treated with activated carbon and dried and the benzene was then distilled off. A dark brown liquid remains. The liquid weighed 22 gms. and had a strong mercaptan odor. The product was distilled under reduced pressure and fraction distilling at 190–200° retained. It was further purified by dissolving it in acetone, treating it with activated carbon, concentrating it down, adding 95% ethanol and chilling it in an ice-bath. The crystals were filtered off and dried. The purification procedure was repeated and the benzylthiolpyrazinoate sintered at 50°–56° C., and melted at 56°–57° C. The product was soluble in acetone, benzene, ether and hot 95% alcohol. Partly soluble in 95% alcohol, insoluble in water.

EXAMPLE 7 p-Chlorophenylthiolpyrazinoate

Thirteen grams of pyrazinoyl chloride were suspended in 100 ml. of dry benzene and to this mixture was added 16.1 g. of p-chlorothiolphenol. The reaction mixture was refluxed 2.0 hours and a dark-brown solution resulted. The solution was dried over anhydrous magnesium sulfate, treated with activated charcoal, filtered and then concentrated to a thick brown oil. This oil was fractionally distilled under reduced pressure using initially the steam cone as a source of heat and after all the unreacted p-chlorothiolphenol was sublimed off, a free flame was used to distill over the p-chlorophenylthiolpyrazinoate which boiled at 120°–125° C./10 mm. The product solidified immediately and was recrystallized from benzene. The recrystallized product weighed 7.0 gms. and melted at 120°–121° C.

EXAMPLE 8

Ethyl-s-pyrazinoyl thioglycollate 20 grams of thioglycollic acid were added to 250 cc. of absolute ethanol containing 1 cc. of concentrated sulfuric acid. This mixture was refluxed on a steam cone overnight, then concentrated to dryness. The residual light yellow oil was distilled at room pressure and the fraction coming over at 155°–160° C. was collected. 14.5 grams of a colorless oil was obtained.

The above 14.5 grams of the ester in absolute ethanol was added to a solution of 6.6 grams of sodium methoxide in absolute ethanol. Agitation for 15 minutes caused a clouding of the solution and upon the complete evacuation of the ethanol under reduced pressure, 22.4 grams of the sodium derivative were obtained.

16 gms. of pyrazinoyl chloride were prepared in the usual manner, by refluxing pyrazinoic acid in thionyl chloride for three hours and distilling off the acid chloride after getting rid of all the excess unreacted thionyl chloride. The pyrazinoyl chloride was suspended in ethyl acetate and added to the 22.4 gms. of the ethyl-s-sodio thioglycollate (prepared above) in ethyl acetate. The resulting purple suspension was stirred overnight after a slight exothermic reaction had subsided. The next morning, the solution was filtered, to remove the inorganic salts, and concentrated to dryness. The product was a mixture of a yellow solid and a deep red oil. Upon the addition of a small amount of ethanol, the oil went into solution and the solid was filtered off. The solid was carefully washed with cold ethanol as it proved to be somewhat soluble in this medium. 4.3 grams of a yellow solid was collected which melted at 71°–75° C. The filtrate was concentrated to dryness and the residual oil was distilled under reduced pressure. A solid which vaporized and solidified in the receiving flask at 120°–200° C./18 mm. pressure was collected, whereas, the material in the distilling flask decomposed completely. The solid proved to be a further amount of the desried product as shown by a mix-melt determination. 4.0 grams of the distillate was collected and pooled with the filtered product. Recrystallization from ethanol lowered the melting point to 65°–68° C., and gave a fine colorless crystalline product which on analysis was in close agreement with the theoretical values for ethyl-s-pyrazinoyl thioglycollate.

EXAMPLE 9 o-Carboxyphenylthiolpyrazinoate 21 gms. of freshly prepared pyrazinoyl chloride, 23 gms. of thiosalicylic acid and 400 mls. of dry benzene were all added together in a one liter flask and refluxed for about 26 hours (overnight). The benzene solution was decanted off and the residue was extracted three times with 50 mls. portions of dry warm benzene. The benzene solution was next distilled off on the steam bath, the liquid left in the flask was cooled. The crystals that were formed were filtered and washed with ether. The crude yield of 21 gms. of yellow crystals was obtained. The product was purified twice by dissolving it in 95% hot alcohol, then adding an equal amount of water, stirring well, cooling down to about 10° C., filtering and drying it. Sinters 179°–185° C., and melts at 185°–186° C. Product is soluble in hot 95% ethanol and hot acetone, partly soluble in ethanol, acetone and insoluble in benzene, ether and water.

EXAMPLE 10 o-Ethyl-s-pyrazinoyl xanthate

Twelve grams of dry pyrazinoyl chloride were suspended in 50 mls. of dry benzene and chilled by means of an ice-bath to 10°–15° C. Ten grams of potassium ethyl xanthate recently prepared was added to the suspension and the mixture stirred for three hours at 10° C. A brown solution and a granular precipitate resulted. The solid substance was separated by filtration and the filtrate was treated with activated charcoal and dried over magnesium sulfate (anhydrous). The benzene was distilled off under reduced pressure at room temperature and a yellow, syrupy material remained which crsytallized on standing. The yellow crystalline o-ethyl-s-pyrazinoyl xanthate melted at 65°–67° C., and weighed 8.0 grams.

We claim:

1. Compounds having the general formula:

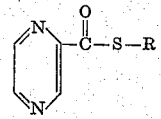

in which R is a member of the group consisting of a lower alkyl, phenyl, monocarboxyphenyl, monohalophenyl, benzyl and lower carboxyalkyl radicals.

2. A lower alkylthiopyrazinoate.
3. Ethylthiolpyrazinoate.
4. n-Propylthiolpyrazinoate.
5. Phenylthiolpyrazinoate.
6. Benzylthiolpyrazinoate.
7. o-Carboxyphenylthiolpyrazinoate.
8. A method of preparing compounds having the general formula:

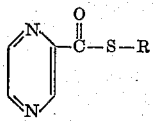

in which R is a member of the group consisting of lower alkyl, phenyl, monocarboxyphenyl, monohalophenyl, benzyl and lower carboxyalkyl radicals, which comprises reacting pyrazinoyl chloride with a mercaptan having the formula:

wherein X is a member of the group consisting of hydrogen, alkali metal and lead radicals and R is as defined above and recovering said compound therefrom.

9. A method of preparing a lower alkylthiopyrazinoate which comprises reacting pyrazinoyl chloride with a lead lower alkylmercaptide and recovering said compound therefrom.

10. A method of preparing ethylthiolpyrazinoate which comprises reacting pyrazinoyl chloride with lead ethylmercaptide and recovering said compound therefrom.

11. A method of preparing n-propylthiolpyrazinoate which comprises reacting pyrazinoyl chloride with n-propylmercaptan and recovering said compound therefrom.

12. A method of preparing phenylthiolpyrazinoate which comprises reacting pyrazinoyl chloride with thiolphenol and recovering said compound therefrom.

13. A method of preparing benzylthiolpyrazinoate which comprises reacting pyrazinoyl chloride with lead benzylmercaptide and recovering said compound therefrom.

14. A method of preparing o-carboxyphenylthiolpyrazinoate which comprises reacting pyrazinoyl chloride with thiosalicyclic acid and recovering said compound therefrom.

HARRY P. DALALIAN.
SAMUEL KUSHNER.

References Cited in the file of this patent

UNITED STATES PATENTS

| Number | Name | Date |
|---|---|---|
| 2,149,279 | Dalmer et al. | Mar. 7, 1939 |